US006609578B2

(12) United States Patent
Patel et al.

(10) Patent No.: US 6,609,578 B2
(45) Date of Patent: *Aug. 26, 2003

(54) SHALE HYDRATION INHIBITION AGENT AND METHOD OF USE

(75) Inventors: Arvind D. Patel, Sugar Land, TX (US); Emanual Stamatakis, Houston, TX (US); Eric Davis, Houston, TX (US)

(73) Assignee: Mo M-I LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/884,013

(22) Filed: Jun. 18, 2001

(65) Prior Publication Data

US 2002/0092681 A1 Jul. 18, 2002

Related U.S. Application Data

(63) Continuation-in-part of application No. 09/709,962, filed on Nov. 10, 2000, now Pat. No. 6,484,821, which is a continuation-in-part of application No. 09/503,558, filed on Feb. 11, 2000, now Pat. No. 6,247,543.

(51) Int. Cl.$^7$ .............................. B09K 1/00; C09K 7/02; E21B 21/00
(52) U.S. Cl. .............................. 175/64; 175/66; 175/72; 405/129.25; 405/129.3; 405/129.35; 507/111; 507/133; 507/246; 507/269; 507/925
(58) Field of Search .............................. 175/64, 65, 66, 175/72; 106/900; 166/294, 308; 507/111, 113, 117, 131, 133, 140, 212, 246, 269, 905, 922, 925; 405/129.25, 124.3, 129.35, 129.4, 264

(56) References Cited

U.S. PATENT DOCUMENTS

| | | | |
|---|---|---|---|
| 2,960,464 A | 11/1960 | Weiss et al. | |
| 3,123,559 A | 3/1964 | Fischer | |
| 3,385,789 A | 5/1968 | King | |

(List continued on next page.)

FOREIGN PATENT DOCUMENTS

| | | |
|---|---|---|
| CA | 876019 | 7/1971 |
| CA | 1185779 | 4/1985 |
| CA | 2088344 | 6/1987 |
| DE | 3238394 | 4/1984 |
| DE | 272287 A1 | 10/1989 |
| EP | 0125957 | 4/1984 |
| EP | 0136773 | 6/1984 |
| EP | 0 136 773 | 4/1985 |
| EP | 0182669 | 5/1986 |
| EP | 0241340 | 3/1987 |
| EP | 0 241 340 | 10/1987 |
| EP | 88/07499 | 10/1988 |
| EP | 0330379 | 8/1989 |
| EP | 90/07337 | 7/1990 |
| EP | 0634468 | 1/1995 |
| EP | 0838514 | 4/1998 |
| GB | 2164370 | 3/1986 |
| GB | 2175291 A | 11/1986 |
| RU | 486128 | 1/1976 |
| RU | 1320220 | 6/1987 |
| WO | 93/02151 | 2/1993 |
| WO | 01/59028 | 8/2001 |
| WO | 02 38697 | 5/2002 |

OTHER PUBLICATIONS

J.P. Tatum, "Organophilic Clays for Low–Toxicity Drilling Fluids," *3rd Royal Chemicals in the Oil Industry Symposium*, pp. 31–36, Manchester England, 1988.

J.P. Tatum, "Organophilic Clays," *Royal Industrial Applications of Surfactants Symposium*, pp. 289–306. Salford, England, 1987.

J.K. Borcharrdt, "Organic Polymer Formation Damage Control Chemicals A Review of Basic Chemistry and Field Results", *Symposium on Advances in Oil Field Chemistry* Presented Before the Division of Petroleum Chemistry Inc. American Chemical Society. Toronto, Canada, Jun. 1988.

B. Bajdjuk, et al., "New Methods for Determining Physico–Mechanical Properties of Rocks, in Order to Choose Drilling Fluids", *Nafta*, vol. 44, No. 10, pp. 261–264, Russia, Oct., 1988.

M.I. Lipkes, et., "Effect of the Addition of Quarternary Ammonium Compounds on the Properties of Water Base Clay Drilling Muds", *Neft Khoz*, No. 6, pp. 33–35, Russia, Jun., 1990.

T.W. Beihoffer, et al., "The Development of an Inhibitive Cationic Drilling Fluid for Slim–Hole Coring Applications", *Society of Petroleum Engineers Drilling Conference* Proceedings, Houston, Texas, Feb. 27–Mar. 2, 1990, pp. 341–351.

R.H. Retz, et. al., "An Environmentally Acceptable and Field–Practical, Cationic Polymer Mud System", *Society of Petroleum Engineers Offshore Europe Conference*, Aberdeen, Sep. 1991, pp. 325–336.

(List continued on next page.)

*Primary Examiner*—George Suchfield
(74) *Attorney, Agent, or Firm*—Stephen Cagle; Carter White; Howrey Simon Arnold & White LLP

(57) ABSTRACT

A water-base fluid for use in drilling wells and other drilling operation includes a shale which swells in the presence of water. The fluid preferably includes: an aqueous based continuous phase, and a shale hydration inhibition agent having the formula:

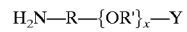

$H_2N-R-\{OR'\}_x-Y$ in which R and R' are alkylene groups having 1 to 6 carbon atoms and x is a value from about 1 to about 25. The Y group should be an amine or alkoxy group, preferably a primary amine or a methoxy group. The shale hydration inhibition agent should be present in sufficient concentration to reduce the swelling of the shale. The fluid may be used for formulating drilling fluids such as invert emulsion drilling muds or clear brine drilling fluids. The fluid may also be used in the slurrification and disposal of drill cuttings that contain water swellable clays or shales.

23 Claims, No Drawings

U.S. PATENT DOCUMENTS

| | | | |
|---|---|---|---|
| 3,404,165 A | 10/1968 | Budde, Jr. et al. | |
| 3,726,796 A | 4/1973 | Schweiger | |
| 3,852,201 A * | 12/1974 | Jackson | 175/66 |
| 3,928,695 A | 12/1975 | Philp et al. | |
| 3,956,141 A | 5/1976 | Walker | |
| 4,148,736 A | 4/1979 | Meister | |
| 4,220,585 A | 9/1980 | Javora et al. | |
| 4,366,071 A | 12/1982 | McLaughlin et al. | |
| 4,366,072 A | 12/1982 | McLaughlin et al. | |
| 4,366,074 A | 12/1982 | McLaughlin et al. | |
| 4,374,739 A | 2/1983 | McLaughlin et al. | |
| 4,383,933 A | 5/1983 | Jenkins | |
| 4,435,564 A | 3/1984 | House | |
| 4,440,649 A | 4/1984 | Loftin et al. | |
| 4,519,922 A | 5/1985 | Sutton et al. | |
| 4,526,693 A | 7/1985 | Son et al. | |
| 4,536,297 A | 8/1985 | Loftin et al. | |
| 4,605,772 A | 8/1986 | Darby et al. | |
| 4,637,883 A | 1/1987 | Patel et al. | |
| 4,645,608 A | 2/1987 | Rayborn | |
| 4,666,613 A | 5/1987 | Schapira et al. | |
| 4,710,586 A | 12/1987 | Patel et al. | |
| 4,713,183 A | 12/1987 | Patel et al. | |
| 4,767,549 A | 8/1988 | McEwen et al. | |
| 4,792,412 A | 12/1988 | Heilweil | |
| 4,820,511 A | 4/1989 | Hoeffkee et al. | |
| 4,828,724 A | 5/1989 | Davidson | |
| 4,828,726 A | 5/1989 | Hines et al. | |
| 4,842,073 A | 6/1989 | Himes et al. | 166/294 |
| 4,847,342 A | 7/1989 | Peiffer | 526/229 |
| 4,889,645 A | 12/1989 | Firth et al. | |
| 4,913,585 A | 4/1990 | Thompson et al. | |
| 4,940,764 A | 7/1990 | Meister | 527/400 |
| 4,942,929 A | 7/1990 | Malachosky et al. | 175/66 |
| 4,990,270 A | 2/1991 | Meister | |
| 5,026,490 A | 6/1991 | Peiffer et al. | |
| 5,066,753 A | 11/1991 | Peiffer | 526/310 |
| 5,089,151 A | 2/1992 | Hall et al. | |
| 5,097,904 A | 3/1992 | Himes | 166/294 |
| 5,099,923 A | 3/1992 | Aften et al. | 166/294 |
| 5,129,469 A | 7/1992 | Jackson | 175/66 |
| 5,149,690 A | 9/1992 | Patel et al. | 507/131 |
| 5,211,250 A | 5/1993 | Kubena, Jr. et al. | 175/72 |
| 5,226,749 A | 7/1993 | Perkins | 405/128 |
| 5,260,268 A | 11/1993 | Forsberg et al. | 507/133 |
| 5,310,285 A | 5/1994 | Northcott | 588/250 |
| 5,314,265 A | 5/1994 | Perkins et al. | 405/128 |
| 5,330,662 A | 7/1994 | Jahnke et al. | |
| 5,339,912 A | 8/1994 | Hosie et al. | 175/66 |
| 5,350,740 A | 9/1994 | Patel et al. | 507/129 |
| 5,358,049 A | 10/1994 | Hale et al. | 166/293 |
| 5,380,706 A | 1/1995 | Himes et al. | 507/129 |
| 5,405,223 A | 4/1995 | Sirevag | 405/128 |
| 5,405,224 A | 4/1995 | Aubert et al. | 405/128 |
| 5,424,284 A | 6/1995 | Patel et al. | 507/129 |
| 5,480,863 A | 1/1996 | Oakley et al. | 507/225 |
| 5,558,161 A | 9/1996 | Vitthal et al. | 166/280 |
| 5,558,171 A | 9/1996 | McGlothlin et al. | 175/64 |
| 5,589,603 A | 12/1996 | Alexander et al. | 588/250 |
| 5,593,952 A | 1/1997 | Jarrett | 507/131 |
| 5,662,169 A | 9/1997 | Hosie | 166/344 |
| 5,741,758 A | 4/1998 | Pakulski | 507/90 |
| 5,771,971 A | 6/1998 | Horton et al. | 166/283 |
| 5,789,352 A | 8/1998 | Carpenter et al. | 507/209 |
| 5,804,535 A | 9/1998 | Dobson et al. | 507/111 |
| 5,908,814 A | 6/1999 | Patel et al. | 507/131 |
| 5,961,438 A | 10/1999 | Ballantine et al. | 588/250 |
| 6,054,416 A | 4/2000 | Bland | 507/136 |
| 6,063,737 A | 5/2000 | Haberman et al. | 507/261 |
| 6,103,671 A | 8/2000 | Dobson et al. | 507/261 |
| 6,106,733 A | 8/2000 | Wood | 210/774 |
| 6,119,779 A | 9/2000 | Gipson et al. | 166/267 |
| 6,124,244 A | 9/2000 | Murphey | 507/111 |
| 6,213,213 B1 | 4/2001 | van Batenburg et al. | 166/300 |
| 6,247,543 B1 | 6/2001 | Patel et al. | |

OTHER PUBLICATIONS

Kirk–Othmer, "Encyclopedia of Chemical Technology", Third Edition, vol. 1, A to Alkanolamines, pp. 944–960, 1978.

Web Page www.huntsman.com Product Information entitled JEFFAMINE® PolyoxyalkyleneAmines, Nov. 19, 1999.

Web Page www.huntsman.com Product Information entitled Diamine Products, Nov. 19, 1999.

Technical Bulletin of Huntsman entitled JEFFAMINE$^R$ D–230 Polyoxypropylenediamine.

* cited by examiner

SHALE HYDRATION INHIBITION AGENT AND METHOD OF USE

This application is a continuation-in-part of U.S. patent application Ser. No. 09/709,962, filed Nov. 10, 2000, now U.S. Pat. 6,484,821, and a continuation-in-part of U.S. patent application Ser. No. 09/503,558, filed Feb. 11, 2000, now U.S. Pat. 6,247,543.

BACKGROUND OF THE INVENTION

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low permeability filter cake that seals openings in formations penetrated by the bit and act to reduce the unwanted influx of formation fluids from permeable rocks.

Drilling fluids are typically classified according to their base material. In oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Three types of solids are usually found in water base drilling fluids: 1) clays and organic colloids added to provide necessary viscosity and filtration properties; 2) heavy minerals whose function is to increase the drilling fluid's density; and 3) formation solids that become dispersed in the drilling fluid during the drilling operation.

The formation solids that become dispersed in a drilling fluid are typically the cuttings produced by the drill bit's action and the solids produced by borehole instability. Where the formation solids are clay minerals that swell, the presence of either type of formation solids in the drilling fluid can greatly increase drilling time and costs.

Clay minerals are generally crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces.

A unit layer is composed of multiple sheets. One sheet is called the octahedral sheet, it is composed of either aluminum or magnesium atoms octahedrally coordinated with the oxygen atoms of hydroxyls. Another sheet is called the tetrahedral sheet. The tetrahedral sheet consists of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms.

The unit layers stack together face-to-face and are held in place by weak attractive forces. The distance between corresponding planes in adjacent unit layers is called the c-spacing. A clay crystal structure with a unit layer consisting of three sheets typically has a c-spacing of about $9.5 \times 10^{-7}$ mm.

In clay mineral crystals, atoms having different valences commonly will be positioned within the sheets of the structure to create a negative potential at the crystal surface. In that case, a cation is adsorbed on the surface. These adsorbed cations are called exchangeable cations because they may chemically trade places with other cations when the clay crystal is suspended in water. In addition, ions may also be adsorbed on the clay crystal edges and exchange with other ions in the water.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's c-spacing thus resulting in an increase in volume. Two types of swelling may occur.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers which results in an increased c-spacing. Virtually all types of clays swell in this manner.

Osmotic swelling is a second type of swelling. Where the concentration of cations between unit layers in a clay mineral is higher than the cation concentration in the surrounding water, water is osmotically drawn between the unit layers and the c-spacing is increased. Osmotic swelling results in larger overall volume increases than surface hydration. However, only certain clays, like sodium montmorillonite, swell in this manner.

Exchangeable cations found in clay minerals are reported to have a significant impact on the amount of swelling that takes place. The exchangeable cations compete with water molecules for the available reactive sites in the clay structure. Generally cations with high valences are more strongly adsorbed than ones with low valences. Thus, clays with low valence exchangeable cations will swell more than clays whose exchangeable cations have high valences.

In the North Sea and the United States Gulf Coast, drillers commonly encounter argillaceous sediments in which the predominant clay mineral is sodium montmorillonite (commonly called "gumbo shale"). Sodium cations are predominately the exchangeable cations in gumbo shale. As the sodium cation has a low positive valence (i.e. formally a +1 valence), it easily disperses into water. Consequently, gumbo shale is notorious for its swelling.

Clay swelling during the drilling of a subterranean well can have a tremendous adverse impact on drilling operations. The overall increase in bulk volume accompanying clay swelling impedes removal of cuttings from beneath the drill bit, increases friction between the drill string and the sides of the borehole, and inhibits formation of the thin filter cake that seals formations. Clay swelling can also create other drilling problems such as loss of circulation or stuck pipe that slow drilling and increase drilling costs. Thus, given the frequency in which gumbo shale is encountered in drilling subterranean wells, the development of a substance and method for reducing clay swelling remains a continuing challenge in the oil and gas exploration industry.

One method to reduce clay swelling is to use salts in drilling fluids. Salts generally reduce the swelling of clays.

However, salts flocculate the clays resulting in both high fluid losses and an almost complete loss of thixotropy. Further, increasing salinity often decreases the functional characteristics of drilling fluid additives.

Another method for controlling clay swelling is to use organic shale inhibitor molecules in drilling fluids. It is believed that the organic shale inhibitor molecules are adsorbed on the surfaces of clays with the added organic shale inhibitor competing with water molecules for clay reactive sites and thus serve to reduce clay swelling.

Organic shale inhibitor molecules can be either cationic, anionic, or nonionic. Cationic organic shale inhibitors dissociate into organic cations and inorganic anions, while anionic organic shale inhibitors dissociate into inorganic cations and organic anions. Nonionic organic shale inhibitor molecules do not dissociate.

It is important that the driller of subterranean wells be able to control the Theological properties of drilling fluids by using additives, including organic shale inhibitor molecules. In the oil and gas industry today it is desirable that additives work both onshore and offshore and in fresh and salt water environments. In addition, as drilling operations impact on plant and animal life, drilling fluid additives should have low toxicity levels and should be easy to handle and to use to minimize the dangers of environmental pollution and harm to operators. Any drilling fluid additive should also provide desirable results but should not inhibit the desired performance of other additives. The development of such additives will help the oil and gas industry to satisfy the long felt need for superior drilling fluid additives which act to control the swelling of the clay and drilled formations without adversely effecting the Theological properties of drilling fluids. The present invention addresses this need.

SUMMARY OF THE INVENTION

The present invention is generally directed to a water-base drilling fluid for use in drilling wells through a formation containing a shale clay which swells in the presence of water. The inventive drilling fluid includes: an aqueous based continuous phase; a weight material; and a shale hydration inhibition agent. Preferably the shale hydration inhibition agent has a formula:

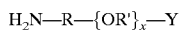

in which R and R' are alkylene groups having 1 to 6 carbon atoms and x is a value from about 1 to about 25. The Y group should be an amine or alkoxy group, preferably a primary amine or a methoxy group. The shale hydration inhibition agent should be present in a sufficient concentration to reduce the swelling of gumbo shale or other hydrophillic rocks encoutered during the drilling of wells with the inventive drilling fluid. The alkylene groups, R and R' may be the same or they may be different from each other and may include a mixture of alkylene groups. That is to say that R and R' may have a mixture of a different number of carbon atoms.

Another illustrative embodiment of the present invention is a water-base drilling fluid as described above in which the shale hydration inhibition agent may be selected from:

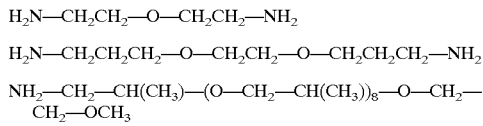

and mixtures of these. As with the previously described drilling fluid, the hydration inhibition agent should be present in the drilling fluid in sufficient concentrations to reduce the swelling of the clay.

Further the shale hydration inhibition agents should preferably be characterized by a relatively low toxicity as measured by the Mysid shrimp test and compatibility with anionic drilling fluid components that may be present in the drilling fluid. The United States Environmental Protection Agency has specified a Mysid shrimp bioassay as the means for assessing marine aquatic toxicity of drilling fluids. A detailed account of the procedure for measuring toxicity of drilling fluids is described in Duke, T. W., Parrish, P. R.; "Acute Toxicity of Eight Laboratory Prepared Generic Drilling Fluids to Mysids (Mysidopsis)" 1984 EPA-600/3-84-067, the subject matter of which is incorporated herein by reference.

For purposes of understanding the term "low toxicity" within the context of this application, the term refers to a drilling fluid with an LC50 of greater than 30,000 ppm by the Mysid shrimp test. Although 30,000 has been the number used for purposes of evaluation it should not be considered a limitation on the scope of this invention. Rather, the tests provide a context for use of the term "low toxicity" as used in the present invention which will be readily understood by those with ordinary skill in the art. Other LC50 values may be viable in various environmental settings. An LC50 value of greater than 30,000 has been equated to an "environmentally compatible" product.

The drilling fluids of the present invention preferably have an aqueous based continuous phase selected from: fresh water, sea water, brine, mixtures of water and water soluble organic compounds and mixtures thereof. In addition such a drilling fluid may further contain a fluid loss control agent selected from the group of organic synthetic polymers, biopolymers and sized particle diatomaceous earth, and mixtures thereof. It is in the scope of the present invention that the drilling fluid may further contain an encapsulating agent such as one preferably selected from the group consisting of organic and inorganic polymers and mixtures thereof. A weight material may also be included in the formulation of the drilling fluid with the weighting agent preferably being selected from the group of barite, hematite, iron oxide, calcium carbonate, magnesium carbonate, soluble and insoluble organic and inorganic salts, and combinations thereof.

Also inclusive within the present invention is a method of reducing the swelling of shale clay in a well comprising circulating in the well a water-base drilling fluid formulated in accordance with the present invention.

These and other features of the present invention are more fully set forth in the following description of illustrative embodiments of the invention.

DESCRIPTION OF ILLUSTRATIVE EMBODIMENTS

The present invention is directed to a water-base drilling fluid for use in drilling wells through a formation containing a shale which swells in the presence of water. Generally the drilling fluid of the present invention includes a weight material, a shale hydration inhibition agent and an aqueous continuous phase. As disclosed below, the drilling fluids of the present invention may also include additional components, such as fluid loss control agents, bridging agents, lubricants, anti-bit balling agents, corrosion inhibition agents, surfactants and suspending agents and the like which may be added to an aqueous based drilling fluid.

The shale hydration inhibition agent of the present invention is preferably a polyoxyalkylenediamines and monoamines which inhibits the swelling of shale that may be encountered during the drilling process. Preferably the alkylene group is a straight chain alkylene, that may be the same (i.e. all ethylene units) different (i.e. methylene, ethylene, propylene, etc.) or mixtures of alkylene groups. However, branched alkylene group can also be used. While a variety of members of this group may serve as shale inhibition agents, we have found that compounds having the general formula

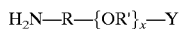

in which R and R' are alkylene groups having 1 to 6 carbon atoms and in which the R and R' groups may be the same or different from each other or mixtures of alkylene groups are effective as shale hydration inhibitors. The Y group should be an amine or alkoxy group, preferably a primary amine or a methoxy group. The important property in the selection of the shale inhibition agents of the present invention is that the selected compounds or mixture of compounds should provide effective inhibition of shale hydration when the shale is exposed to the drilling fluid.

The value of x has been found to be a factor in the ability of the shale hydration inhibitors to carry out their desired role. The value of x may be a whole number or fractional number that reflects the average molecular weight of the compound. In one embodiment of the present invention x may have a value from about 1 to about 25 and preferably have a value between about 1 and about 10.

In one preferred illustrative embodiment of the present invention the shale hydration inhibition agent may be selected from:

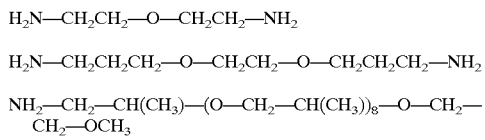

and mixtures of these, and similar compounds.

The shale hydration inhibition agent should be present in sufficient concentration to reduce either or both the surface hydration based swelling and/or the osmotic based swelling of the shale. The exact amount of the shale hydration inhibition agent present in a particular drilling fluid formulation can be determined by a trial and error method of testing the combination of drilling fluid and shale formation encountered. Generally however, the shale hydration inhibition agent of the present invention may be used in drilling fluids in a concentration from about 1 to about 18 pounds per barrel (lbs/bbl or ppb) and more preferably in a concentration from about 2 to about 12 pounds per barrel of drilling fluid.

In addition to the inhibition of shale hydration by the shale hydration inhibition agent, other properties are beneficially achieved. In particular it has been found that the shale hydration inhibition agents of the present invention may also be further characterized by their compatibility with other drilling fluid components, tolerant to contaminants, temperature stability and low toxicity. These factors contribute to the concept that the shale hydration inhibition agents of the present invention may have broad application both in land based drilling operations as well as offshore drilling operations.

The drilling fluids of the present invention include a weight material in order to increase the density of the fluid. The primary purpose for such weighting materials is to increase the density of the drilling fluid so as to prevent kick-backs and blow-outs. One of skill in the art should know and understand that the prevention of kick-backs and blow-outs is important to the safe day to day operations of a drilling rig. Thus the weight material is added to the drilling fluid in a functionally effective amount largely dependent on the nature of the formation being drilled.

Weight materials suitable for use in the formulation of the drilling fluids of the present invention may be generally selected from any type of weighting materials be it in solid, particulate form, suspended in solution, dissolved in the aqueous phase as part of the preparation process or added afterward during drilling. It is preferred that the weight material be selected from the group including barite, hematite, iron oxide, calcium carbonate, magnesium carbonate, organic and inorganic salts, and mixtures and combinations of these compounds and similar such weight materials that may be utilized in the formulation of drilling fluids.

The aqueous based continuous phase may generally be any water based fluid phase that is compatible with the formulation of a drilling fluid and is compatible with the shale hydration inhibition agents disclosed herein. In one preferred embodiment, the aqueous based continuous phase is selected from: fresh water, sea water, brine, mixtures of water and water soluble organic compounds and mixtures thereof. The amount of the aqueous based continuous phase should be sufficient to form a water based drilling fluid. This amount may range from nearly 100% of the drilling fluid to less than 30% of the drilling fluid by volume. Preferably, the aqueous based continuous phase is from about 95 to about 30% by volume and preferably from about 90 to about 40% by volume of the drilling fluid.

In addition to the other components previously noted, materials generically referred to as gelling materials, thinners, and fluid loss control agents, are optionally added to water base drilling fluid formulations. Of these additional materials, each can be added to the formulation in a concentration as Theologically and functionally required by drilling conditions. Typical gelling materials used in aqueous based drilling fluids are bentonite, sepiolite, clay, attapulgite clay, anionic high-molecular weight polymer and biopolymers.

Thinners such as lignosulfonates are also often added to water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

A variety of fluid loss control agents may be added to the drilling fluids of the present invention that are generally selected from a group consisting of synthetic organic polymers, biopolymers, and mixtures thereof. The fluid loss control agents such as modified lignite, polymers, modified starches and modified celluloses may also be added to the water base drilling fluid system of this invention. In one embodiment it is prefered that the additives of the invention should be selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, mixtures of these and the like.

The drilling fluid of the present invention may further contain an encapsulating agent generally selected from the group consisting of synthetic organic, inorganic and biopolymers and mixtures thereof. The role of the encapsulating agent is to absorb at multiple points along the chain onto the clay particles, thus binding the particles together and encapsulating the cuttings. These encapsulating agents help improve the removal of cuttings with less dispersion of the cuttings into the drilling fluids. The encapsulating agents may be anioic, cationic, amphoteric, or non-ionic in nature.

Other additives that could be present in the drilling fluids of the present invention include products such as lubricants, penetration rate enhancers, defoamers, corrosion inhibitors and loss circulation products. Such compounds should be known to one of ordinary skill in the art of formulating aqueous based drilling fluids.

The use of the above disclosed drilling fluids is contemplated as being within the scope of the present invention. Such use would be conventional to the art of drilling subterranean wells and one having skill in the art should appreciate such processes and applications.

Thus one embodiment of the present invention may include a method of reducing the swelling of shale clay in a well, involving circulating in the well a water-base drilling fluid formulated in accordance with the present disclosure. Preferably such a fluid would include: an aqueous based continuous phase, a weight material and a shale hydration inhibition agent having the formula:

$$H_2N-R-\{OR'\}_x-Y$$

As noted above, R and R' are alkylene groups having 1 to 6 carbon atoms and x should have a value from about 1 to about 25. Preferably x has a value between about 1 and about 10. The Y group should be an amine or alkoxy group, preferably a primary amine or a methoxy group. Further the drilling fluid should include the shale hydration inhibition agent present in sufficient concentration to reduce the swelling of the clay encountered in the well drilling process.

In another embodiment a diamine compound is preferred. Thus the shale hydration inhibition agent has the formula:

$$H_2N-CH(CH_3)CH_2\{-OCH_2CH(CH_3)-\}_x-NH_2$$

In such instances, x should have a value less than 15, and preferably between about 1 and about 5 and more preferably x should have an average number of about 2.6.

Another embodiment of the present inventive method includes a method of reducing the swelling of shale in a well comprising circulation in the well, a water-base fluid formulated in accordance with the teachings of this disclosure.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Unless otherwise stated, all starting materials are commercially available and standard laboratory techniques and equipment are utilized. The tests were conducted in accordance with the procedures in API Bulletin RP 13B-2, 1990.

The following abbreviations are sometimes used in describing the results discussed in the examples:

"PV" is plastic viscosity (CPS) which is one variable used in the calculation of viscosity characteristics of a drilling fluid.

"YP" is yield point (lbs/100 ft$^2$)which is another variable used in the calculation of viscosity characteristics of drilling fluids.

"GELS" (lbs/100 ft$^2$)is a measure of the suspending characteristics and the thixotropic properties of a drilling fluid.

"F/L" is API fluid loss and is a measure of fluid loss in milliliters of drilling fluid at 100 psi.

EXAMPLE 1

In the present example, a variety of polyoxyalkylamines were tested to determine if they would function as shale exhibitors.

The following test was conducted to demonstrate the maximum amount of API bentonite that can be inhibited by a single 10 pounds per barrel (ppb) treatment of shale inhibitor of the present invention over a period of days. This test procedure uses pint jars that are filled with one barrel equivalent of tap water and about 10 ppb of a shale inhibitor. Tap water was used as a control sample. All samples were adjusted to at least a pH of 9 and treated with about 10 ppb portion of M-I GEL (bentonite) at a medium shear rate. After stirring for about 30 minutes, the rheologies were measured and then the samples were heat aged overnight at about 150° F. After the samples were cooled their rheologies and pH values were measured and recorded. All samples were then adjusted, to a pH value of at least about 9 before treating them again with bentonite as previously described.

This procedure was carried out for each sample until all of the samples were too thick to measure. Tables 1 to 6 present data illustrating the shale inhibition effects of the present invention by the daily addition of bentonite in tap water treated with various inhibitors of present invention. As used below, Jeffamine D-230 is a polyoxyalkyldiamine available from Huntsman Chemicals and S-2053 is a polyoxyethylenediamine available from Champion Chemicals.

TABLE 1

| 600 RPM Rheology Data Heat Aged Data-pH 11.0–11.8 10 ppb | | |
|---|---|---|
| M-I Gel | Jeffamine D-230 | S-2053 |
| 20 | 5 | 40 |
| 30 | 6 | 43 |
| 40 | 8 | 44 |
| 50 | 10 | 43 |
| 60 | 13 | 29 |
| 70 | 20 | 49 |
| 80 | 29 | 79 |
| 90 | 55 | 141 |
| 100 | 98 | 300+ |
| 110 | 169 | — |
| 120 | 300+ | — |

TABLE 2

300 RPM Rheology Data
Heat Aged Data-pH 11.0–11.8
10 ppb

| M-I Gel | Jeffamine D-230 | S-2053 |
|---|---|---|
| 20 | 3 | 33 |
| 30 | 3 | 38 |
| 40 | 4 | 36 |
| 50 | 5 | 30 |
| 60 | 7 | 14 |
| 70 | 10 | 25 |
| 80 | 15 | 42 |
| 90 | 30 | 76 |
| 100 | 52 | 290 |
| 110 | 94 | — |
| 120 | 186 | — |

TABLE 3

3 RPM Rheology Data
Heat Aged Data-pH 11.0–11.8
10 ppb

| M-I Gel | Jeffamine D-230 | S-2053 |
|---|---|---|
| 20 | 1 | 5 |
| 30 | 1 | 9 |
| 40 | 1 | 9 |
| 50 | 0 | 5 |
| 60 | 1 | 1 |
| 70 | 1 | 1 |
| 80 | 1 | 1 |
| 90 | 1 | 2 |
| 100 | 1 | 11 |
| 110 | 8 | — |
| 120 | 4 | — |

TABLE 4

10 MIN GELS Data
Heat Aged Data-pH 11.0–11.8
10 ppb

| M-I Gel | Jeffamine D-230 | S-2053 |
|---|---|---|
| 20 | 1 | 5 |
| 30 | 1 | 9 |
| 40 | 1 | 9 |
| 50 | 1 | 7 |
| 60 | 1 | 1 |
| 70 | 2 | 2 |
| 80 | 1 | 2 |
| 90 | 1 | 8 |
| 100 | 1 | 53 |
| 110 | 9 | — |
| 120 | 40 | — |

TABLE 5

Plastic Viscosity Data
Heat Aged Data-pH 11.0–11.8
10 ppb

| M-I Gel | Jeffamine D-230 | S-2053 |
|---|---|---|
| 20 | 2 | 7 |
| 30 | 3 | 5 |
| 40 | 4 | 8 |
| 50 | 5 | 13 |
| 60 | 6 | 15 |
| 70 | 10 | 24 |
| 80 | 14 | 37 |
| 90 | 25 | 65 |
| 100 | 46 | — |
| 110 | 75 | — |
| 120 | — | — |

TABLE 6

Yield Point Data
Heat Aged Data-pH 11.0–11.8
10 ppb

| M-I Gel | Jeffamine D-230 | S-2053 |
|---|---|---|
| 20 | 1 | 26 |
| 30 | 0 | 33 |
| 40 | 0 | 28 |
| 50 | 0 | 17 |
| 60 | 1 | -1 |
| 70 | 0 | 1 |
| 80 | 1 | 5 |
| 90 | 5 | 11 |
| 100 | 6 | — |
| 110 | 16 | — |
| 120 | — | — |

Upon review of the above data in Tables 1–6, one of skill in the art can see that the dioxyethylenediamine product (S-2053) gives good shale inhibiting characteristics and properties.

EXAMPLE 2

The evaluation of the dioxyethylenediamine product that has been neutralized in the test fluid with hydrochloric acid to a pH value of about 9.0 has been conducted. The results in the tables 7–12 show the performance of the drilling fluids of this invention at a pH value of about 9.0.

TABLE 7

600 RPM Rheology Data
Heat Aged Data-pH 9.0
10 ppb

| M-I Gel | Jeffamine D-230 | S-2053 |
|---|---|---|
| 20 | 4 | 4 |
| 30 | 4 | 4 |
| 40 | 6 | 6 |
| 50 | 7 | 6 |
| 60 | 8 | 7 |
| 70 | 9 | 9 |
| 80 | 13 | 13 |
| 90 | 16 | 14 |
| 100 | 15 | 15 |
| 110 | 21 | 19 |
| 120 | 25 | 23 |
| 130 | 31 | 28 |
| 140 | 44 | 36 |
| 140 | — | — |
| 160 | 180 | 82 |
| 170 | — | 204 |

TABLE 8

300 RPM Rheology Data
Heat Aged Data-pH 9.0
10 ppb

| M-I Gel | Jeffamine D-230 | S-2053 |
| --- | --- | --- |
| 20 | 2 | 2 |
| 30 | 3 | 3 |
| 40 | 3 | 3 |
| 50 | 3 | 3 |
| 60 | 4 | 4 |
| 70 | 5 | 6 |
| 80 | 8 | 8 |
| 90 | 11 | 9 |
| 100 | 10 | 10 |
| 110 | 14 | 13 |
| 120 | 17 | 15 |
| 130 | 19 | 19 |
| 140 | 26 | 25 |
| 140 | — | — |
| 160 | 130 | 62 |
| 170 | — | 150 |

TABLE 9

3 RPM Rheology Data
Heat Aged Data-pH 9.0
10 ppb

| M-I Gel | Jeffamine D-230 | S-2053 |
| --- | --- | --- |
| 20 | 1 | 1 |
| 30 | 1 | 1 |
| 40 | 1 | 1 |
| 50 | 1 | 1 |
| 60 | 1 | 1 |
| 70 | 2 | 2 |
| 80 | 3 | 3 |
| 90 | 5 | 4 |
| 100 | 4 | 3 |
| 110 | 7 | 6 |
| 120 | 8 | 7 |
| 130 | 7 | 9 |
| 140 | 7 | 14 |
| 150 | — | — |
| 160 | 65 | 35 |
| 170 | — | 90 |

TABLE 10

10 MIN GELS Data
Heat Aged Data-pH 9.0
10 ppb

| M-I Gel | Jeffamine D-230 | S-2053 |
| --- | --- | --- |
| 20 | 0 | 0 |
| 30 | 0 | 0 |
| 40 | 0 | 0 |
| 50 | (−1) | 0 |
| 60 | 0 | 1 |
| 70 | 1 | 3 |
| 80 | 3 | 3 |
| 90 | 6 | 4 |
| 100 | 5 | 5 |
| 110 | 7 | 7 |
| 120 | 9 | 7 |
| 130 | 12 | 10 |
| 140 | 8 | 14 |
| 150 | — | — |
| 160 | 80 | 42 |
| 170 | — | 90 |

TABLE 11

Plastic Viscosity Data
Heat Aged Data - pH 9.0
10 ppb

| M-I Gel | Jeffamine D-230 | S-2053 |
| --- | --- | --- |
| 20 | 2 | 2 |
| 30 | 1 | 1 |
| 40 | 3 | 3 |
| 50 | 4 | 3 |
| 60 | 4 | 3 |
| 70 | 4 | 3 |
| 80 | 5 | 5 |
| 90 | 5 | 5 |
| 100 | 5 | 5 |
| 110 | 7 | 6 |
| 120 | 8 | 8 |
| 130 | 12 | 9 |
| 140 | 18 | 11 |
| 150 | — | — |
| 160 | 50 | 20 |
| 170 | — | 54 |

TABLE 12

Yield Point Data
Heat Aged Data - pH 9.0
10 ppb

| M-I Gel | Jeffamine D-230 | S-2053 |
| --- | --- | --- |
| 20 | 0 | 0 |
| 30 | 2 | 2 |
| 40 | 0 | 0 |
| 50 | −1 | 0 |
| 60 | 0 | 1 |
| 70 | 1 | 3 |
| 80 | 3 | 3 |
| 90 | 6 | 4 |
| 100 | 5 | 5 |
| 110 | 7 | 7 |
| 120 | 9 | 7 |
| 130 | 7 | 10 |
| 140 | 8 | 14 |
| 150 | — | — |
| 160 | 80 | 42 |
| 170 | — | 96 |

Upon review of the above data in Tables 7–12, one of skill in the art can see that the dioxyethylenediamine product (S-2053) gives good shale inhibiting properties at a pH value of about 9.0.

EXAMPLE 3

To further demonstrate the performance of the drilling fluids formulated in accordance with the teachings of this invention, a test using a bulk hardness tester was conducted. A BP Bulk Hardness Tester is a device designed to give an assessment of the hardness of shale cuttings exposed to drilling fluids which in turn can be related to the inhibiting properties of the drilling fluid being evaluated. In this test, shale cutting are hot rolled in the test drilling fluid at 150° F. for 16 hours. Shale cuttings are screened and then placed into a BP Bulk Hardness Tester. The equipment is closed and using a torque wrench the force used to extrude the cuttings through a plate with holes in it is recorded. Depending on the hydration state and hardness of the cuttings and the drilling fluid used, a plateau region in torque is reached as extrusion of the cuttings begins to take place. Alternatively, the torque may continue to rise which tends to occur with harder cuttings samples. Therefore, the higher the torque number obtained, the more inhibitive the drilling fluid system is considered. Illustrative data obtained using three different concentrations of each test product with three different cuttings are given below.

TABLE 13

Bulk Hardness Data

Arne Cuttings

| No. Turns | S-2053 @ 1% | S-2053 @ 3% | S-2053 @ 5% | D-230 @ 1% | D-230 @ 3% | D-230 @ 5% |
|---|---|---|---|---|---|---|
| 0 | | | | | | |
| 1 | | | | | | |
| 2 | | | | | | |
| 3 | | | | | | |
| 4 | | | | | | |
| 5 | | | | | 10 | 10 |
| 6 | | | | | 10 | 20 |
| 7 | 10 | 15 | 10 | 20 | 70 | 110 |
| 8 | 50 | 50 | 50 | 80 | 160 | 180 |
| 9 | 50 | 70 | 70 | 100 | 200 | 240 |
| 10 | 60 | 80 | 80 | 120 | 230 | 260 |
| 11 | 60 | 80 | 80 | 130 | 240 | 290 |
| 12 | 60 | 80 | 85 | 130 | 250 | 310 |
| 13 | 60 | 90 | 85 | 140 | 290 | 330 |
| 14 | 65 | 90 | 100 | 170 | | |
| 15 | 200 | | 150 | | | |
| 16 | | | | | | |

TABLE 14

Bulk Hardness Data

Foss Eikeland Clay

| No. Turns | S-2053 @ 1% | S-2053 @ 3% | S-2053 @ 5% | D-230 @ 1% | D-230 @ 3% | D-230 @ 5% |
|---|---|---|---|---|---|---|
| 0 | | | | | | |
| 1 | | | | | | |
| 2 | | | | | | |
| 3 | | | | | | |
| 4 | | | | | | |
| 5 | | | | | 10 | 10 |
| 6 | | 10 | 10 | 10 | 20 | 20 |
| 7 | | 15 | 20 | 20 | 50 | 50 |
| 8 | 10 | 40 | 70 | 30 | 280 | 290 |
| 9 | 20 | 230 | 310 | 200 | | |
| 10 | 80 | 330 | | | | |
| 11 | 230 | | | | | |
| 12 | 260 | | | | | |
| 13 | 290 | | | | | |
| 14 | | | | | | |
| 15 | | | | | | |

TABLE 15

Bulk Hardness Data

Oxford Clay

| No. Turns | S-2053 @ 1% | S-2053 @ 3% | S-2053 @ 5% | D-230 @ 1% | D-230 @ 3% | D-230 @ 5% |
|---|---|---|---|---|---|---|
| 0 | | | | | | |
| 1 | | | | | | |
| 2 | | | | | | |
| 3 | | | | 10 | 10 | 10 |
| 4 | | | 10 | 15 | 20 | 20 |
| 5 | | 10 | 10 | 20 | 35 | 25 |
| 6 | | 15 | 20 | 50 | 70 | 40 |
| 7 | 10 | 50 | 70 | 180 | 250 | 100 |
| 8 | 50 | 160 | 190 | | | |
| 9 | 100 | 205 | 200 | | | |
| 10 | 130 | 210 | 220 | | | |
| 11 | 130 | 210 | 220 | | | |
| 12 | 120 | 200 | 210 | | | |
| 13 | 130 | 210 | 210 | | | |
| 14 | 150 | 220 | 240 | | | |
| 15 | 250 | | | | | |
| 16 | | | | | | |

Upon review of the above data in Tables 13–15, one skilled in the art should observe that drilling fluids formulated according to the teachings of this invention prevent the hydration of various types of shale clays and thus are likely to provide good performance in drilling subterranean wells encountering such shale clays.

EXAMPLE 4

In the present example, RMR 8-38 is a polyoxyethylenepropylenediamine available from Champion Chemicals was tested to determine if it would function as a shale inhibitor as described in the present invention. Pint jars were filled with about one barrel equivalent of tap water and the test sample, the pH value was adjusted to a value of about 9 and treated with about 50 ppb portion M-I GEL (bentonite) at a medium shear rate. After stirring for about 30 minutes, the rheologies were measured and then the samples were heat aged overnight at about 150° F. After the samples were rolled their rheologies and pHs were recorded. The following data (Table 16) is representative of how the rheologies are affected by the addition of about 50 ppb of bentonite in tap water treated with shale inhibitors of this invention.

TABLE 16

Bentonite Inhibition - 50 gms M-I GEL

Heat Aged Data - pH @ 8.0

| | 600 | 300 | 200 | 100 | 6 | 3 |
|---|---|---|---|---|---|---|
| D-230 | 5 | 3 | 2 | 2 | 1 | 1 |
| S-2053 | 5 | 3 | 2 | 2 | 1 | 1 |
| RMR 8-38 | 5 | 3 | 2 | 2 | 1 | 1 |

| | Gels 10 sec | Gels 10 min | PV | YP | PH |
|---|---|---|---|---|---|
| D-230 | 1 | 1 | 2 | 1 | 7.7 |
| S-2053 | 1 | 1 | 2 | 1 | 7.6 |
| RMR 8-38 | 1 | 1 | 2 | 1 | 7.0 |

The results above example show the superior shale inhibition performance of drilling fluids formulated in accordance with the teachings of the present invention.

EXAMPLE 5

Dispersion and BP Bulk Hardness Tests were run with Arne cuttings by hot rolling about 40.0 g of cuttings having a US standard mesh size of about 5–8. in approximately one-barrel equivalent of a field mud for about 16 hours at about 150° F. The field mud was a lignosulfonate water based mud, 18.13 pounds per gallon weighed with barite from Murphy E&P, Vermilion Parish, Louisiana. After hot rolling, the cuttings were screened using a US standard 20 mesh screen and washed with 10% KCl aqueous solution and dried to obtain the percentage recovered. The same procedure was used to obtain cuttings for the BP Bulk Hardness Tester as described previously. The following results are illustrative of the data from this evaluation and are given in Tables 17 and 18.

TABLE 17

Shale Dispersion Test
Arne Cuttings (4.6–8.0 mm)

|  | % Total Recovered |
|---|---|
| Base Field Mud | <5 |
| Base Mud + Jeffamine D230 | >90 |
| Base Mud + Special Products S-2053 | >90 |

TABLE 18

Bulk Hardness Data

| No. Turns | Base Mud | Base Mud +3% D-230 | Base Mud +3% S-2053 |
|---|---|---|---|
| 1 | ** | — | — |
| 2 | ** | — | — |
| 3 | ** | — | — |
| 4 | ** | 10 | — |
| 5 | ** | 15 | 10 |
| 6 | ** | 40 | 20 |
| 7 | ** | 80 | 60 |
| 8 | ** | 90 | 70 |
| 9 | ** | 100 | 80 |
| 10 | ** | 105 | 80 |
| 11 | ** | 120 | 90 |
| 12 | ** | 140 | 90 |
| 13 | ** | 150 | 120 |
| 14 | ** | 210 | 180 |
| 15 | ** |  |  |

**Indicates that the cuttings were dissolved and test could not be run.

Rheology Data
Heat Aged Data - Initial

|  | Base Mud | Base Mud + 3% 2053 |
|---|---|---|
| Rheology @ 600 rpm | 158 | 150 |
| Rheology @ 300 rpm | 92 | 84 |
| Rheology @ 3 rpm | 5 | 4 |
| Gels |  |  |
| 5 sec. | 7 | 5 |
| 10 min. | 15 | 10 |
| Plastic Viscosity | 66 | 66 |
| Yield Point | 26 | 18 |
| pH | 9 | 11 |

Rheology Data
Heat Aged Data After Dispersion Test - Arne Cuttings (40 g)

|  | Base Mud | Base Mud + 3% 2053 |
|---|---|---|
| Rheology @ 600 rpm | 300 | 165 |
| Rheology @ 300 rpm | 270 | 95 |
| Rheology @ 3 rpm | 50 | 5 |
| Gels |  |  |
| 5 sec. | 57 | 8 |
| 10 min. | 134 | 15 |
| Plastic Viscosity | — | 70 |
| Yield Point | — | 25 |
| pH | 9.1 | 12.7 |

Upon review of the above data in Tables 17–18 and the rheology data, one skilled in the art should observe that a field mud formulated so that it becomes a drilling fluid formulated according to the teachings of this invention prevent the hydration of various types of shale clays and thus are likely to provide good performance in drilling subterranean wells encountering such shale clays.

EXAMPLE 6

In this procedure a pint jar was filled with one barrel equivalent of tap water and test sample, adjusted the pH to at least 9 and treated with a 50 ppb portion M-I GEL (bentonite) at a medium shear rate. After stirring for 30 minutes, the rheologies were measured and then the samples were heat aged overnight at 150° F. After the samples were cooled their rheologies and pHs were recorded. The following data is representative of how the rheologies are affected by the addition of the 50 ppb of bentonite in tap water treated with the experimental inhibitors.

Bentonite Hydration Study
Initial Rheology

| Additive | RPM | | | | | |
|---|---|---|---|---|---|---|
|  | 600 | 300 | 200 | 100 | 6 | 3 |
| Jeffamine M-600 | 52 | 33 | 25 | 17 | 5 | 4 |

* If 600 RPM reading is greater than 300, no further readings were taken.
Jeffamine M-600 is polyalkoxyalkene amine from Huntsman Chemicals.

Bentonite Hydration Study
Initial Rheology

| Additive | Gels 10 sec. | Gels 10 min. | PV | YP | pH |
|---|---|---|---|---|---|
| Jeffamine M-600 | 11 | 25 | 19 | 14 | 11.1 |

| | Bentonite Hydration Study Heat Aged Rheology (150° F.) | | | | | |
|---|---|---|---|---|---|---|
| | RPM | | | | | |
| Additive | 600 | 300 | 200 | 100 | 6 | 3 |
| Jeffamine M-600 | 40 | 24 | 17 | 10 | 1 | 1 |

* If 600 RPM reading is greater than 300, no further readings were taken.

| | Bentonite Hydration Study Heat Aged Rheology (150° F.) | | | | |
|---|---|---|---|---|---|
| Additive | Gels 10 sec. | Gels 10 min. | PV | YP | pH |
| Jeffamine M-600 | 1 | 1 | 16 | 8 | 11.1 |

The above results should show to one of skill in the art that Jeffamine M-600 a compound having the formula

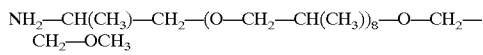

and within the scope of this invention performed well as shale hydration inhibitors.

EXAMPLE 7

The following test was conducted to demonstrate the maximum amount of API bentonite that can be inhibited by a single 10 pounds per barrel (ppb) treatment of shale inhibitor of the present invention over a period of days. This test procedure uses pint jars that are filled with one barrel equivalent of tap water and 10 ppb of a shale inhibitor. Tap water was used as a control sample. All samples were adjusted to at least a pH of 9 and treated with a 10 ppb portion of M-I GEL (bentonite) at a medium shear rate. After stirring for 30 minutes, the rheologies were measured and then the samples were heat aged overnight at 150° F. After the samples were cooled their rheologies and pHs were recorded. All samples were then adjusted to at least a pH 9 before treating them again with bentonite as previously described. This procedure was carried out for each sample until all were too thick to measure. The following tables present representative data that shows shale inhibition effects of the present invention by the daily addition of bentonite in tap water treated with the inhibitors indicated at the top of each column.

TABLE 19

600 rpm Rheologies - Heat Aged (150° F.)

| Bentonite (lb/bbl) | Base | Jeffamine M-600 |
|---|---|---|
| 30 | 162 | 18 |
| 40 | 300* | 35 |
| 50 | — | 74 |
| 60 | — | 146 |
| 70 | — | 259 |
| 80 | — | — |
| 90 | — | — |

*If 600 RPM reading is greater than 300, no further readings were taken.

TABLE 20

300 rpm Rheologies - Heat Aged (150° F.)

| Bentonite (lb/bbl) | Base | Jeffamine M-600 |
|---|---|---|
| 30 | 112 | 9 |
| 40 | — | 18 |
| 50 | — | 41 |
| 60 | — | 71 |
| 70 | — | 121 |
| 80 | — | — |
| 90 | — | — |

TABLE 21

3 rpm Rheologies - Heat Aged (150° F.)

| Bentonite (lb/bbl) | Base | Jeffamine M-600 |
|---|---|---|
| 30 | 8 | 0 |
| 40 | 132 | 0 |
| 50 | — | 0 |
| 60 | — | 0 |
| 70 | — | 0 |
| 80 | — | — |
| 90 | — | — |

TABLE 22

10 Min Gels - Heat Aged (150° F.)

| Bentonite (lb/bbl) | Base | Jeffamine M-600 |
|---|---|---|
| 30 | 30 | 0 |
| 40 | 184 | 0 |
| 50 | — | 0 |
| 60 | — | 0 |
| 70 | — | 3 |
| 80 | — | — |
| 90 | — | — |

TABLE 23

Plastic Viscosity - Heat Aged (150°)

| Bentonite (lb/bbl) | Base | Jeffamine M-600 |
|---|---|---|
| 30 | 50 | 9 |
| 40 | — | 16 |
| 50 | — | 33 |
| 60 | — | 75 |
| 70 | — | 138 |
| 80 | — | — |
| 90 | — | — |

TABLE 24

Yield Point - Heat Aged (150°)

| Bentonite (lb/bbl) | Base | Jeffamine M-600 |
|---|---|---|
| 30 | 62 | 1 |
| 40 | — | 1 |
| 50 | — | 8 |
| 60 | — | 4 |
| 70 | — | 17 |

TABLE 24-continued

Yield Point - Heat Aged (150°)

| Bentonite (lb/bbl) | Base | Jeffamine M-600 |
|---|---|---|
| 80 | — | — |
| 90 | — | — |

Upon review of the above rheology data, one of skill in the art should appreciate and see that Jeffamine M-600 performs as a shale hydration inhibitor within the scope of the present invention.

EXAMPLE 8

The fluids of the present invention can also be used in the slurrification and as a carrier fluid for drill cuttings disposal. The following example illustrates this utility in forming a pumpable slurry of shale containing drill cuttings:

Between 50 and 350 g of the specified drill cuttings were added to the test fluid in a blender. Tap water was used as a base fluid with several drops of a defoaming agent added. The test fluid was identical to the base fluid but contained 5% of Jeffamine D 230 as described above. The mixture in the blender was blended for 5 minutes and the cuttings slurry was placed into a heater cup and the rheology of the sample was tested at 120° F. The following tables contain representative data for three different types of cuttings.

Raw Bentonite Cuttings (50 g)

| Rheology @ 120° F. | Base fluid (tap water) | Base fluid & 5% Jeffamine D 230 |
|---|---|---|
| 600 rpm | 208 | 50 |
| 300 rpm | 154 | 47 |
| 200 rpm | 129 | 48 |
| 100 rpm | 93 | 48 |
| 6 rpm | 24 | 22 |
| 3 rpm | 18 | 17 |
| Gels, 10 sec. | 20 | 17 |
| Gels, 10 min. | 52 | 20 |
| PV | 54 | 3 |
| YP | 100 | 44 |

Raw Bentonite Cuttings (75 g)

| Rheology @ 120° F. | Base fluid (tap water) | Base fluid & 5% Jeffamine D 230 |
|---|---|---|
| 600 rpm | ** | 81 |
| 300 rpm | ** | 75 |
| 200 rpm | ** | 78 |
| 100 rpm | ** | 78 |
| 6 rpm | ** | 40 |
| 3 rpm | ** | 34 |
| Gels, 10 sec. | ** | 31 |
| Gels, 10 min. | ** | 33 |
| PV | ** | 6 |
| YP | ** | 69 |

**Sample is too thick to measure.

Gulf of Mexico - Trinidad Shale Cuttings (300 g)

| Rheology @ 120° F. | Base fluid (tap water) | Base fluid & 5% Jeffamine D 230 |
|---|---|---|
| 600 rpm | 95 | 25 |
| 300 rpm | 88 | 20 |
| 200 rpm | 82 | 18 |
| 100 rpm | 77 | 16 |
| 6 rpm | 35 | 12 |
| 3 rpm | 33 | 11 |
| Gels, 10 sec. | 31 | 7 |
| Gels, 10 min. | 51 | 5 |
| PV | 7 | 5 |
| YP | 81 | 15 |

Upon review of the above data, one of ordinary skill in the art should appreciate that the addition of the shale hydration inhibitors of the present invention permit the formation of pumpable slurries of shale containing drill cuttings. Pumpable slurries as the term is used in this application are those slurries of drill cutting solids that can be pumped and thus injected into a subterranean formation for disposal. Further, as shown in the first two tables, the shale hydration inhibitors of the present invention allow the inclusion of much higher solids content than can be achieved otherwise.

In view of the above disclosure, one of skill in the art should understand and appreciate that one illustrative embodiment of the present invention includes a water-base drilling fluid for use in drilling wells through a formation containing a shale which swells in the presence of water. In such an illustrative embodiment, the drilling fluid comprising, an aqueous based continuous phase, a weight material, and a shale hydration inhibition agent. The shale hydration inhibition agent should have the general formula:

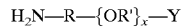

$$H_2N\text{—}R\text{—}\{OR'\}_x\text{—}Y$$

in which R and R' are alkylene groups having 1 to 6 carbon atoms and x has a value from about 1 to about 25. The Y group should be an amine or alkoxy group, preferably a primary amine or a methoxy group. The shale hydration inhibition agent should be present in sufficient concentration so as to reduce the swelling and hydration of shale.

One aspect of the present illustrative embodiment, x has an average number between about 1 and about 25 and preferably about 1 to about 10. In another aspect of the present illustrative embodiment, R and R' are alkylene groups having a different number of carbon atoms. The illustrative drilling fluid should be formulated so as to include a shale hydration inhibition agent that is characterized by low toxicity and compatibility with anionic drilling fluid components. It is preferred that in the present illustrative embodiments that the aqueous based continuous phase may be selected from: fresh water, sea water, brine, mixtures of water and water soluble organic compounds and mixtures thereof. Further the illustrative drilling fluids may contain a fluid loss control agent selected from the group including organic polymers, starches, and mixtures thereof. An encapsulating agent may also be included and preferably the encapsulating agent may be selected from the group organic and inorganic polymers and mixtures thereof. The illustrative drilling fluid may include a weight material selected from: barite, hematite, iron oxide, calcium carbonate, magnesium carbonate, magnesium organic and inorganic salts, calcium chloride, calcium bromide, magnesium chloride, zinc halides and combinations thereof.

Another illustrative embodiment of the present invention includes a water-base drilling fluid for use in drilling wells through a formation containing a shale clay which swells in the presence of water. In such an illustrative embodiment, the drilling fluid may include: an aqueous based continuous phase, a weight material, and a shale hydration inhibition agent selected from the group:

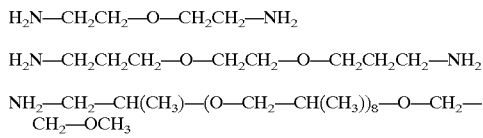

and mixtures of these. The hydration inhibition agent should be present in the drilling fluid in sufficient concentrations to reduce the swelling of the clay. In one preferred illustrative embodiment, the aqueous based continuous phase may be selected from: fresh water, sea water, brine, mixtures of water and water soluble organic compounds and mixtures thereof. The illustrative drilling fluid may further contain a fluid loss control agent selected from organic polymers, starches, and mixtures thereof. In addition, the illustrative drilling fluid may further contain an encapsulating agent selected from organic and inorganic polymers and mixtures thereof. It is preferred that the weight material in the present illustrative embodiment be selected from barite, hematite, iron oxide, calcium carbonate, magnesium carbonate, magnesium organic and inorganic salts, calcium chloride, calcium bromide, magnesium chloride, zinc halides and combinations thereof.

The present invention also encompasses a method of reducing the swelling of shale clay encountered during the drilling of a subterranean well, In one illustrative embodiment, the method includes: circulating in the subterranean well during the drilling of said well a water-base drilling fluid that includes: an aqueous based continuous phase and a shale hydration inhibition agent having the formula:

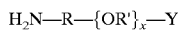

in which R and R' are alkylene groups having 1 to 6 carbon atoms and x is a value from about 1 to about 25 and preferably from about 1 to about 10. The Y group should be an amine or alkoxy group, preferably a primary amine or a methoxy group. As noted previously, the shale hydration inhibition agent should be present in sufficient concentration to reduce the swelling of the shale clay. The shale hydration inhibition agent may be further characterized by low toxicity and compatibility with anionic drilling fluid components.

Another illustrative embodiment of the present invention includes a method of reducing the swelling of shale clay encountered during the drilling of a subterranean well, in which the method includes: circulating in the subterranean well a water-base drilling fluid. The fluid of the illustrative method is formulated to include: an aqueous based continuous phase, a weight material, and a functionally effective concentration of a shale hydration inhibition agent selected from:

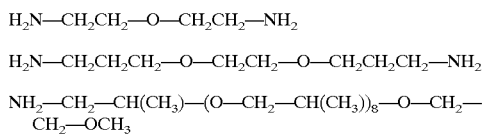

and mixtures of these compounds. The shale hydration inhibition agent should be present in a concentration sufficient to reduce the swelling of the shale clay. It is preferred within this illustrative method that the aqueous based continuous phase may be selected from: fresh water, sea water, brine, mixtures of water and water soluble organic compounds and mixtures thereof.

It should also be appreciated that the fluids of the present invention can be used in the disposal of drill cuttings that contain swellable shale materials. Generally the method of disposing of drill cuttings by injection includes the separation of the drill cuttings from the drilling fluid, grinding or slurrification of the drill cuttings in a liquid medium and then injection of the slurry into a subterranean formation that is the target of the disposal operation. The methods and techniques of such disposal processes should be well known to one of skill in the art. The following U.S. patents are representative of the methods and other potential uses for the fluids of the present invention: U.S. Pat. Nos. 4,942,929; 5,129,469; 5,226,749; 5,310,285; 5,314,265; 5,405,224; 5,589,603; 5,961,438; 5,339,912; 5,358,049; 5,405,223; 5,589,603; 5,662,169; and 6,106,733; and 6,119,779, all of the contents of each of these patents being incorporated by reference into the present disclosure.

Thus one illustrative embodiment of the present invention includes a composition that includes: an aqueous based continuous phase; a swellable shale material; and a shale hydration inhibition agent as described above. Preferably the shale hydration inhibition agent has the formula:

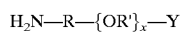

in which R and R' are alkylene groups having 1 to 6 carbon atoms, x is a value from about 1 to about 25 preferably between about 1 and about 10, and Y is an amine or alkoxy group. The shale hydration inhibition agent is present in sufficient concentration to reduce the swelling of the shale.

In one embodiment of such an illustrative fluid, the R and R' are alkylene groups having a different number of carbon atoms or a same number of carbon atoms. The aqueous based continuous phase component is preferably selected from: fresh water, sea water, brine, mixtures of water and water soluble organic compounds and mixtures thereof. The composition may also include a fluid loss control agent that is preferably selected from organic polymers, starches, and mixtures thereof. In addition the composition may optionally include an encapsulating agent which is preferably selected from organic and inorganic polymers and mixtures thereof. The shale hydration inhibition agent discussed above may be any member of the generic group discussed that functions as a shale hydration inhibitor. It has been found that especially preferred shale inhibitors include:

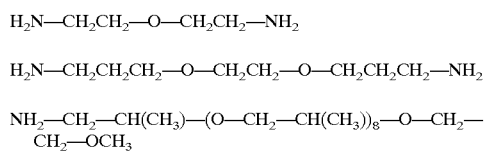

and mixtures of these.

The present invention also encompasses a water-base fluid for use in the slurrification and injection of drill cuttings into a subterranean formation for disposal. Such a fluid is especially useful in circumstances when the drill cuttings include water swellable clays and shales. In view of the forgoing, one illustrative fluid includes: an aqueous based continuous phase, and a shale hydration inhibition agent as substantially described above. In one preferred embodiment, the shale hydration inhibition agent has the formula:

$$H_2N-R-\{OR'\}_x-Y$$

in which R and R' are alkylene groups having 1 to 6 carbon atoms, x is a value from about 1 to about 25, and Y is an amine or alkoxy group. In another preferred embodiment, shale hydration inhibition agent is selected from:

$$H_2N-CH_2CH_2-O-CH_2CH_2-NH_2$$

$$H_2N-CH_2CH_2CH_2-O-CH_2CH_2-O-CH_2CH_2CH_2-NH_2$$

$$NH_2-CH_2-CH(CH_3)-(O-CH_2-CH(CH_3))_8-O-CH_2-CH_2-OCH_3$$

and mixtures of these. In any of the above formulations, the shale hydration inhibition agent is present in the drilling fluid in sufficient concentrations to reduce the swelling of shale clay that may be contained in the drill cuttings. A preferred embodiment of the illustrative fluids is formulated such that the aqueous based continuous phase is selected from: fresh water, sea water, brine, mixtures of water and water soluble organic compounds and mixtures of these. The fluid may optionally contain a fluid loss control agent selected from the group consisting of organic polymers, starches, and mixtures thereof as well as any of the other optional components previously mentioned.

One of skill in the art should appreciate that the present invention includes a method of disposing of drill cuttings that include a water swellable shale, into a subterranean formation. Such an illustrative method includes: grinding the drill cuttings in a water-base fluid to form a slurry, and injecting said slurry into said subterranean formation. The water based fluid is that described above and preferably contains: an aqueous based continuous phase and a shale hydration inhibition agent as previously described above. A preferred embodiment includes a shale hydration inhibition agent having the formula:

$$H_2N-R-\{OR'\}_x-Y$$

in which R and R' are alkylene groups having 1 to 6 carbon atoms, x is a value from about 1 to about 25 preferably from about 1 to about 10, and Y is an amine or alkoxy group. Another illustrative embodiment includes a shale hydration inhibition agent selected from:

$$H_2N-CH_2CH_2-O-CH_2CH_2-NH_2$$

$$H_2N-CH_2CH_2CH_2-O-CH_2CH_2-O-CH_2CH_2CH_2-NH_2$$

$$NH_2-CH_2-CH(CH_3)-(O-CH_2-CH(CH_3))_8-O-CH_2-CH_2-OCH_3$$

and mixtures of these. In all such formulations, the shale hydration inhibition agent is present in sufficient concentration to reduce the swelling of the clay.

It should also be appreciated that the fluids of the present invention may be used as the basis for fluids used in other operations associated with subterranean wells and the drilling of such wells. Examples of such alternative uses include use as a clear brine drilling fluid or as the basis for a formation fracturing fluid, a formation packing fluid, a well packing and/or stability fluid, a well logging fluid; well reworking fluid and the like. The following patents are representative of the methods and other potential uses for the fluids of the present invention: 6,063,737 (describing an aqueous displacement fluid); 6,213,213 (describing viscosified aqueous well treating compositions); 5,558,161 (describing a aqueous gel fluids for formation fracturing); 5,789,352 (describing a well completion and spacer fluid); 3,956,141 (describing a clear brine drilling fluid); 4,792,412 (describing a clear brine drilling fluid); 5,480,863 (describing a clear brine drilling fluid); 5,614,728 (describing a clear brine drilling fluid); 5,804,535 (describing a clear brine drilling fluid); and 6,124,244 (describing a clear brine drilling fluid), all of the contents of each of these patents being incorporated by reference into the present disclosure.

Thus one of skill in the art should appreciate that one illustrative embodiment of the present invention includes a clear brine drilling fluid for use in drilling subterranean wells. Such a fluid includes: an aqueous based continuous phase; a viscosifying agent and a shale hydration inhibition agent. Preferably the shale hydration inhibition agent has the formula:

$$H_2N-R-\{OR'\}_x-Y$$

in which R and R' are alkylene groups having 1 to 6 carbon atoms and x is a value from about 1 to about 25, preferably from about 1 to about 10 and Y is an amine or alkoxy group As with the other fluids of the present invention, the clear brine drilling fluid contains the shale hydration inhibition agent in sufficient concentration to reduce the swelling of shale. In such an illustrative embodiment, the viscosifying agent is selected from the group consisting of organic polymers, starches, and mixtures thereof.

The present invention also encompasses a fracturing fluid for use in fracturing subterranean formations. Such an illustrative fluid includes: an aqueous based continuous phase; a viscosifying agent; and a shale hydration inhibition agent. The shale hydration inhibition agent preferably has a the formula:

$$H_2N-R-\{OR'\}_x-Y$$

in which R and R' are alkylene groups having 1 to 6 carbon atoms and x is a value from about 1 to about 25, preferably from about 1 to about 10, and Y is an amine or alkoxy group. As with the other fluids of the present invention, the clear brine drilling fluid contains the shale hydration inhibition agent in sufficient concentration to reduce the swelling of shale. In such an illustrative embodiment, the viscosifying agent is selected from the group consisting of organic polymers, starches, and mixtures thereof. Preferably in the above illustrative embodiment, the viscosifying agent is selected from the group consisting of organic polymers, starches, and mixtures thereof.

While the compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A composition comprising:
an aqueous based continuous phase;
a swellable shale material; and
a shale hydration inhibition agent having the formula:

$$H_2N-R-\{OR'\}_x-Y$$

wherein R and R' are alkylene groups having 1 to 6 carbon atoms and x is a value from about 1 to about 25, and and Y is an amine or alkoxy group wherein the shale hydration inhibition agent is present in sufficient concentration to reduce the swelling of the shale.

2. The composition of claim 1 wherein x has an average number between about 1 and about 10.

3. The composition of claim 1 wherein R and R' are alkylene groups having a different number of carbon atoms or a same number of carbon atoms.

4. The composition of claim 1 wherein the shale hydration inhibition agent being further characterized by low toxicity and compatibility with anionic drilling fluid components.

5. The composition of claim 1 wherein the aqueous based continuous phase is selected from: fresh water, sea water, brine, mixtures of water and water soluble organic compounds and mixtures thereof.

6. The composition of claim 1 further comprising a fluid loss control agent selected from the group consisting of organic polymers, starches, and mixtures thereof.

7. The composition of claim 1 further comprising an encapsulating agent selected from the group consisting of organic and inorganic polymers and mixtures thereof.

8. The composition of claim 1 wherein shale hydration inhibition agent is selected from:

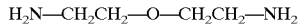
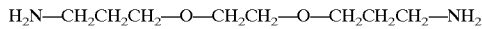
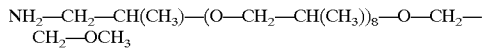

and mixtures of these.

9. A water-base fluid for use in the slurrification and injection of drill cuttings into a subterranean formation for disposal, the fluid comprising an aqueous based continuous phase, and a shale hydration inhibition agent having the formula:

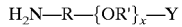

wherein R and R' are alkylene groups having 1 to 6 carbon atoms and x is a value from about 1 to about 25, and and Y is an amine or alkoxy group wherein the hydration inhibition agent is present in the drilling fluid in sufficient concentrations to reduce the swelling of shale clay that may be contained in the drill cuttings.

10. The fluid of claim 9 wherein the aqueous based continuous phase is selected from: fresh water, sea water, brine, mixtures of water and water soluble organic compounds with mixtures thereof.

11. The fluid of claim 10 wherein the drilling fluid further contains a fluid loss control agent selected from the group consisting of organic polymers, starches, and mixtures thereof.

12. The fluid of claim 11 wherein shale hydration inhibition agent is selected from:

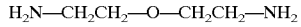
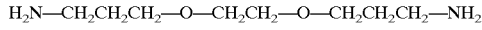
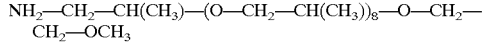

and mixtures of these.

13. A method of disposing of drill cuttings into a subterranean formation, the method comprising:

grinding the drill cuttings in a water-base fluid to form a slurry, wherein the water based fluid includes:

an aqueous based continuous phase and a shale hydration inhibition agent having the formula:

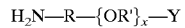

wherein R and R' are alkylene groups having 1 to 6 carbon atoms and x is a value from about 1 to about 25, and Y is an amine or alkoxy group, and wherein the shale hydration inhibition agent is present in sufficient concentration to reduce the swelling of shale, and injecting said slurry into said subterranean formation.

14. The method of claim 13 wherein x has a value of about 1 to about 10.

15. The fluid of claim 13 wherein shale hydration inhibition agent is selected from:

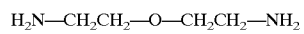
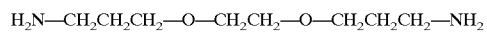
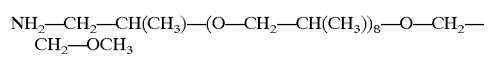

and mixtures of these.

16. A method of disposing of drill cuttings that include a water-swellable shale, into a subterranean formation, the method comprising:

grinding the drill cuttings in a water-base fluid to form a slurry, wherein the water based fluid includes:

an aqueous based continuous phase and a shale hydration inhibition agent selected from:

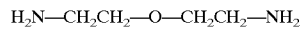
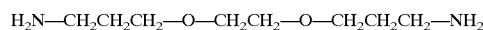
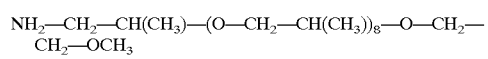

and mixtures of these, wherein the shale hydration inhibition agent is present in sufficient concentration to reduce the swelling of the shale, and injecting said slurry into said subterranean formation.

17. The method of claim 16 wherein the aqueous based continuous phase is selected from: fresh water, sea water, brine, mixtures of water with water soluble organic compounds and mixtures thereof.

18. A clear drilling fluid for use in drilling subterranean wells, said fluid comprising:

an aqueous based continuous phase;

a viscosifying agent and a shale hydration inhibition agent having the formula:

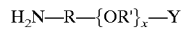

wherein R and R' are alkylene groups having 1 to 6 carbon atoms and x is a value from about 1 to about 25 and Y is an amine or alkoxy group, and wherein the shale hydration inhibition agent is present in sufficient concentration to reduce the swelling of shale.

19. The fluid of claim 18 wherein the viscosifying agent is selected from the group consisting of organic polymers, starches, and mixtures thereof.

20. The fluid of claim 18 wherein the aqueous based continuous phase is selected from: fresh water, sea water, brine, mixtures of water with water soluble organic compounds and mixtures thereof.

21. A fracturing fluid for use in stimulating subterreanean wells, said fluid comprising:

an aqueous based continuous phase;

a viscosifying agent and a shale hydration inhibition agent having the formula:

$$H_2N-R-\{OR'\}_x-Y$$

wherein R and R' are alkylene groups having 1 to 6 carbon atoms and x is a value from about 1 to about 25 and Y is an amine or alkoxy group, and wherein the shale hydration inhibition agent is present in sufficient concentration to reduce the swelling of shale.

22. The fluid of claim 21 wherein the viscosifying agent is selected from the group consisting of organic polymers, starches, and mixtures thereof.

23. The fluid of claim 21 wherein the aqueous based continuous phase is selected from: fresh water, sea water, brine, mixtures of water with water soluble organic compounds and mixtures thereof.

* * * * *